United States Patent
Nabeshi

(10) Patent No.: US 11,926,378 B2
(45) Date of Patent: Mar. 12, 2024

(54) DRIVE CONTROLLER, DRIVE UNIT, AND POWER STEERING

(71) Applicant: NIDEC CORPORATION, Kyoto (JP)

(72) Inventor: Kaori Nabeshi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 562 days.

(21) Appl. No.: 17/259,906

(22) PCT Filed: Jul. 4, 2019

(86) PCT No.: PCT/JP2019/026707
§ 371 (c)(1),
(2) Date: Jan. 12, 2021

(87) PCT Pub. No.: WO2020/013079
PCT Pub. Date: Jan. 16, 2020

(65) Prior Publication Data
US 2021/0291896 A1    Sep. 23, 2021

(30) Foreign Application Priority Data

Jul. 12, 2018  (JP) .................................. 2018-132012

(51) Int. Cl.
*B62D 5/04*       (2006.01)
*H02P 29/024*     (2016.01)

(52) U.S. Cl.
CPC ........... *B62D 5/0487* (2013.01); *B62D 5/049* (2013.01); *H02P 29/027* (2013.01)

(58) Field of Classification Search
CPC ...... B62D 5/0487; B62D 5/049; H02P 29/027
(Continued)

(56) References Cited

U.S. PATENT DOCUMENTS 7,880,417 B2 *  2/2011  Suzuki ................. B62D 5/0487
                                            318/722
8,232,752 B2    7/2012  Kezobo et al.
(Continued)

FOREIGN PATENT DOCUMENTS

JP        11332002 A   * 11/1999
JP        2014121144 A   6/2014

OTHER PUBLICATIONS

Eiji; Translation of JP-11332002-A; 1999; Translated by EPO & Google (Year: 1999).*
(Continued)

*Primary Examiner* — Steven L Yeninas
*Assistant Examiner* — Rahul Maini
(74) *Attorney, Agent, or Firm* — HAUPTMAN HAM, LLP

(57) ABSTRACT

A drive controller according to an aspect controls drive of a three-phase motor, and includes an electric value calculation unit that calculates an electric value in each of coordinate axes of rotating coordinates of the three-phase motor based on an electric value that is at least one of a current value and a voltage value generated in the three-phase motor, and a fault determination unit that determines a fault phase having a fault in phases of the three-phase motor by combining positive-negative information on at least one of a difference between a calculation electric value calculated by the electric value calculation unit and a target electric value indicating a control target of an electric value in each of the coordinate axes, and a variation of the difference, with each of the coordinate axes.

11 Claims, 6 Drawing Sheets

(58) Field of Classification Search
USPC .................................................. 324/765.01
See application file for complete search history.

(56) References Cited

U.S. PATENT DOCUMENTS

| | | | |
|---|---|---|---|
| 8,878,474 B2 | 11/2014 | Kezobo et al. | |
| 2008/0067960 A1* | 3/2008 | Maeda | H02P 21/06 |
| | | | 318/400.02 |
| 2009/0237013 A1* | 9/2009 | Sato | B60L 15/08 |
| | | | 318/400.15 |
| 2014/0139158 A1* | 5/2014 | Tomita | H02P 29/0243 |
| | | | 318/400.21 |
| 2015/0171778 A1* | 6/2015 | Suzuki | H02P 29/0243 |
| | | | 318/400.14 |
| 2017/0117830 A1* | 4/2017 | Kanekawa | H02P 21/22 |
| 2017/0294864 A1* | 10/2017 | Tada | H02P 21/26 |
| 2018/0331644 A1* | 11/2018 | El Khamlichi Drissi | |
| | | | H02P 21/22 |
| 2018/0375457 A1* | 12/2018 | Kitamura | B62D 5/0463 |
| 2021/0229735 A1* | 7/2021 | Kitamura | H02P 21/05 |

OTHER PUBLICATIONS

International Search Report in PCT/JP2019/026707, dated Sep. 10, 2019. 2pp.

\* cited by examiner

DRIVE CONTROLLER, DRIVE UNIT, AND POWER STEERING

CROSS-REFERENCE TO RELATED APPLICATIONS

This is the U.S. national stage of application No. PCT/JP2019/026707, filed on Jul. 4, 2019, and priority under 35 U.S.C. § 119(a) and 35 U.S.C. § 365(b) is claimed from Japanese Patent Application No. 2018-132012, filed on Jul. 12, 2018.

FIELD OF THE INVENTION

The present invention relates to a drive controller, a drive unit, and a power steering.

BACKGROUND

Examples of a conventionally known technique for when any phase of a three-phase motor has a fault include a technique in which the fault phase is detected and motor drive is continued under control switched to backup control corresponding to the failed phase.

For example, there is an electric motor controller that stores a test pattern being a combination of turning on a switching element, and that identifies a short-circuit fault location based on a result of determining whether the test pattern, a current detection value detected by the current detector as a response to the test pattern, and the rotation angle detection value, are each within a range affected by counter-electromotive force.

Unfortunately, identifying a fault location using only the test pattern requires a long time from finding a sign of fault to settling the fault location, so that transition to the backup control delays.

SUMMARY

A drive controller according to an aspect of the present invention controls drive of a three-phase motor, and includes an electric value calculation unit that calculates an electric value in each of coordinate axes of rotating coordinates of the three-phase motor based on an electric value that is at least one of a current value and a voltage value generated in the three-phase motor, and a fault determination unit that determines a fault phase having a fault in phases of the three-phase motor by combining positive-negative information on at least one of a difference between a calculation electric value calculated by the electric value calculation unit and a target electric value indicating a control target of an electric value in each of the coordinate axes, and a variation of the difference, with each of the coordinate axes. A drive unit according to an aspect of the present invention includes the drive controller, and a three-phase motor that is driven under control of the drive controller.

A power steering according to an aspect of the present invention includes the drive controller, a three-phase motor that is driven under control of the drive controller, and a power steering mechanism that is driven by the three-phase motor.

The above and other elements, features, steps, characteristics and advantages of the present disclosure will become more apparent from the following detailed description of the preferred embodiments with reference to the attached drawings.

DETAILED DESCRIPTION

Hereinafter, embodiments of a drive controller, a drive unit, and a power steering of the present disclosure will be described in detail with reference to the accompanying drawings. However, to avoid unnecessarily redundant description below and facilitate understanding by those skilled in the art, unnecessarily detailed description may be eliminated. For example, detailed description of already well-known matters and duplicated description of a substantially identical configuration may be eliminated.

Figure 1:
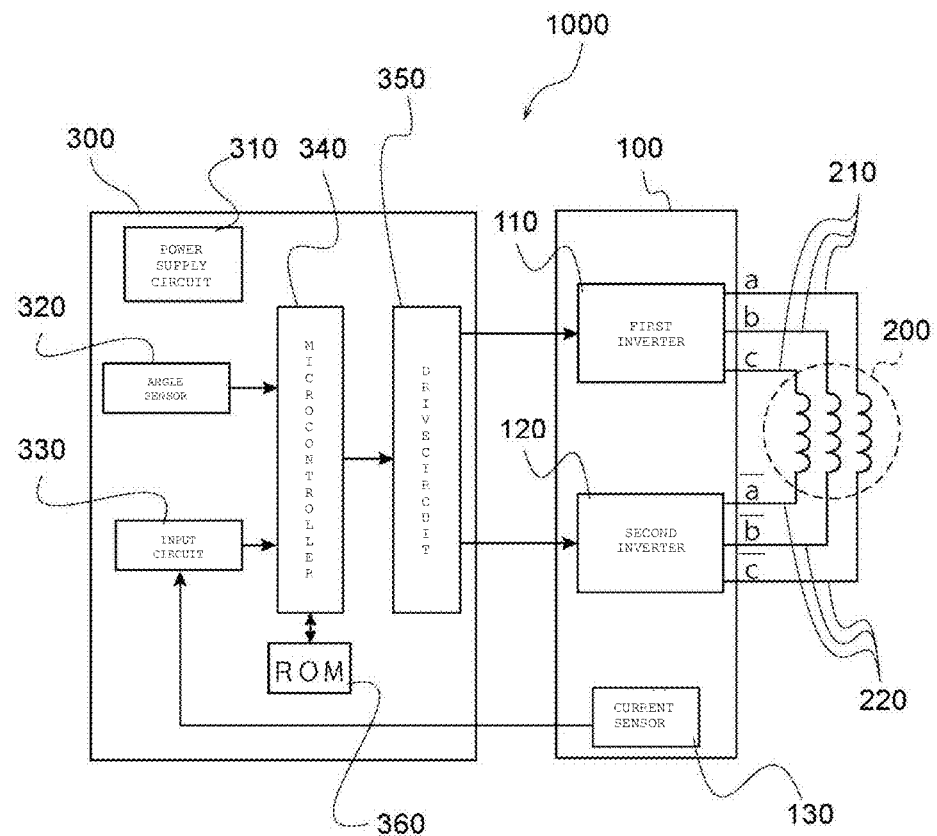
FIG. 1 is a diagram schematically illustrating a block configuration of a motor drive unit according to the present embodiment.

FIG. 1 is a diagram schematically illustrating a block configuration of a motor drive unit 1000 according to the present embodiment. The motor drive unit 1000 includes an electric power supply device 100, a motor 200, and a control circuit 300.

In the present specification, the motor drive unit 1000 including the motor 200 as a component will be described. The motor drive unit 1000 including the motor 200 corresponds to an example of the drive unit of the present invention. However, the motor drive unit 1000 may be a device for driving the motor 200, excluding the motor 200 as a component. The motor drive unit 1000 excluding the motor 200 corresponds to an example of the drive controller of the present invention.

The motor 200 is, for example, a three-phase AC motor. The motor 200 has a-phase, b-phase, and c-phase coils. The coils are wound by a winding method of, for example, concentrated winding or distributed winding.

The motor drive unit 1000 can convert electric power from an external power source into electric power to be supplied to the motor 200 by the electric power supply device 100. For example, a first inverter 110 and a second inverter 120 can convert DC power into three-phase AC power that is a pseudo sine wave of a-phase, b-phase, and c-phase.

The electric power supply device 100 includes the first inverter 110, the second inverter 120, and a current sensor 130. The first inverter 110 is connected to one end 210 of each of the coils of the motor 200, and the second inverter 120 is connected to the other end 220 of each of the coils of the motor 200. In the present specification, "connection" between parts (components) mainly means an electrical connection. The motor 200 is a so-called unconnected motor in which the coils of respective phases are not connected to each other.

The first inverter 110 and the second inverter 120 each include switching elements connected to the respective coils of the motor 200, and electric power is converted and supplied to the motor 200 by switching operation of the switching elements.

The current sensor 130 includes, for example, a shunt resistor and a current detection circuit, and detects a current flowing through the first inverter 110 and the second inverter 120 to detect a current value flowing through the coils of respective phases of the motor 200.

The control circuit 300 includes, for example, a power supply circuit 310, an angle sensor 320, an input circuit 330, a microcontroller 340, a drive circuit 350, and a ROM 360. The control circuit 300 causes the motor 200 to be driven by controlling overall operation of the power converter 100. Specifically, the control circuit 300 can perform closed loop control by controlling target motor torque and rotation speed.

The power supply circuit 310 generates DC voltage (e.g., 3V, 5V) required for each block in the control circuit 300. The angle sensor 320 is, for example, a resolver, or a Hall IC, or is also fabricated by a combination of an MR sensor having a magnetoresistive (MR) element and a sensor magnet. The angle sensor 320 detects a rotation angle of a rotor of the motor 200, and outputs a rotation signal indicating the detected rotation angle to the microcontroller 340. Depending on a motor control method (e.g., sensorless control), the angle sensor 320 may be eliminated.

The input circuit 330 receives the current value detected by the current sensor 130 (hereinafter referred to as an "actual current value"), and converts a level of the actual current value to an input level of the microcontroller 340 as necessary and outputs the actual current value to the microcontroller 340. The input circuit 330 is an analog-to-digital conversion circuit.

The microcontroller 340 receives the rotation signal of the rotor detected by the angle sensor 320, and also receives the actual current value output from the input circuit 330. The microcontroller 340 sets a target current value according to the actual current value and the rotation signal of the rotor and generates a PWM signal, and then outputs the generated PWM signal to the drive circuit 350. For example, the microcontroller 340 generates a PWM signal for controlling the switching operation (turn-on or turn-off) of each of the switch elements in the first inverter 110 and the second inverter 120 of the electric power supply device 100.

The drive circuit 350 is typically a gate driver. The drive circuit 350 generates a control signal (e.g., a gate control signal) to control the switching operation of each of the switch elements in the first and second inverters 110 and 120 in response to the PWM signal, and gives the generated control signal to each of the switch elements. The microcontroller 340 may have a function of the drive circuit 350. In that case, the control circuit 300 may be provided without the drive circuit 350.

The ROM 360 is, for example, a writable memory (e.g., PROM), a rewritable memory (e.g., a flash memory), or a read-only memory. The ROM 360 stores a control program including an instruction group for causing the microcontroller 340 to control the electric power supply device 100 (mainly the inverters 110 and 120).

The electric power supply device 100 has control under normal conditions and control under abnormal conditions. The microcontroller 340 of the control circuit 300 can switch the control of the electric power supply device 100 between the control under normal conditions and the control under abnormal conditions.

Figure 2:
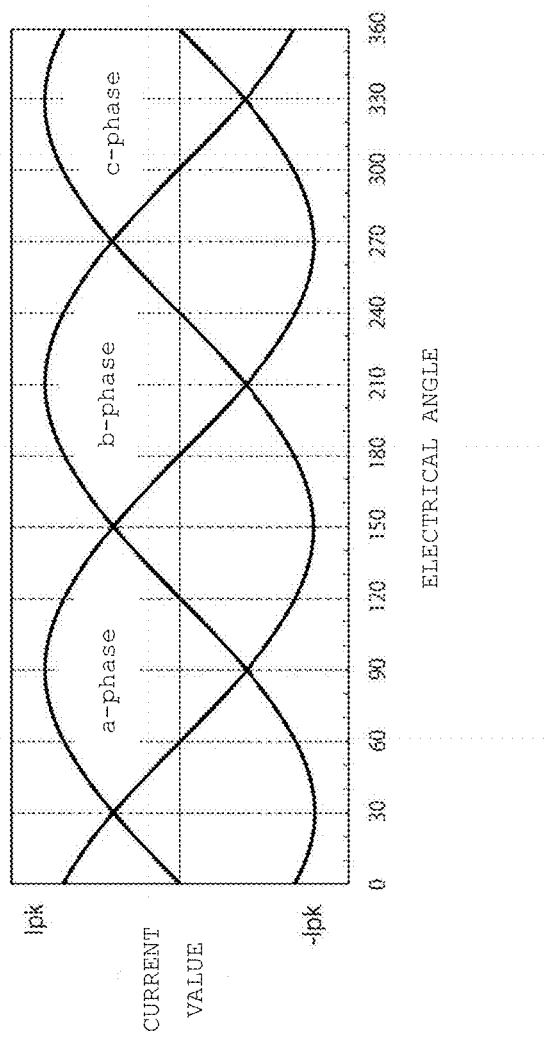
FIG. 2 is a diagram illustrating a current value flowing through each coil of corresponding one of phases of a motor under normal conditions.

FIG. 2 is a diagram illustrating a current value flowing through each coil of each phase of the motor 200 under normal conditions.

FIG. 2 exemplifies a current waveform (sine wave) acquired by plotting current values flowing through each of the a-phase, b-phase, and c-phase coils of the motor 200 when the first inverter 110 and the second inverter 120 are controlled according to three-phase energization control under normal conditions. FIG. 2 has a horizontal axis representing a motor electrical angle (deg), and a vertical axis representing a current value (A). Each of the phases has a maximum current value (peak current value) indicated as $I_{pk}$. Besides the sine wave exemplified in FIG. 2, the electric power supply device 100 can also drive the motor 200 using, for example, a rectangular wave.

Table 1 shows current values flowing through terminals of the respective inverters for each electrical angle in the sine wave of FIG. 2. Specifically, Table 1 shows the current values flowing at a connection point between the first inverter 110 and one end 210 of each of the a-phase, b-phase, and c-phase coils at every 30° electrical angle. Table 1 also shows the current values flowing at a connection point between the second inverter 120 and the other end 220 of each of the a-phase, b-phase, and c-phase coils at every 30° electrical angle. Here, the first inverter 110 has a direction of a current flowing from one end 210 to the other end 220 of the motor 200, being defined as a positive direction. The second inverter 120 has a direction of a current flowing from the other end 220 to the one end 210 of the motor 200, being defined as a positive direction. Table 1 shows a current value $I_1$ having an amplitude acquired by $[(3)^{1/2}/2]*I_{pk}$, and a current value $I_2$ having an amplitude acquired by $I_{pk}/2$.

TABLE 1

| Operation under normal conditions | | Electrical angle [deg] | | | | | | | | | | | |
|---|---|---|---|---|---|---|---|---|---|---|---|---|---|
| | | 0 (360) | 30 | 60 | 90 | 120 | 150 | 180 | 210 | 240 | 270 | 300 | 330 |
| First inverter | a-phase | 0 | $I_2$ | $I_1$ | Ipk | $I_1$ | $I_2$ | 0 | $-I_2$ | $-I_1$ | $-Ipk$ | $-I_1$ | $-I_2$ |
| | b-phase | $-I_1$ | $-Ipk$ | $-I_1$ | $-I_2$ | 0 | $I_2$ | $I_1$ | Ipk | $I_1$ | $I_2$ | 0 | $-I_2$ |
| | c-phase | $I_1$ | $I_2$ | 0 | $-I_2$ | $-I_1$ | $-Ipk$ | $-I_1$ | $-I_2$ | 0 | $I_2$ | $I_1$ | Ipk |
| Second inverter | a-phase | 0 | $-I_2$ | $-I_1$ | $-Ipk$ | $-I_1$ | $-I_2$ | 0 | $I_2$ | $I_1$ | Ipk | $I_1$ | $I_2$ |
| | b-phase | $I_1$ | Ipk | $I_1$ | $I_2$ | 0 | $-I_2$ | $-I_1$ | $-Ipk$ | $-I_1$ | $-I_2$ | 0 | $I_2$ |
| | c-phase | $-I_1$ | $-I_2$ | 0 | $I_2$ | $I_1$ | Ipk | $I_1$ | $I_2$ | 0 | $-I_2$ | $-I_1$ | $-Ipk$ |

At an electrical angle of 0°, the a-phase coil has a current of "0". At the electrical angle of 0°, a current with an amplitude $I_1$ flows from the second inverter 120 to the first inverter 110 through the b-phase coil, and a current with the amplitude $I_1$ flows from the first inverter 110 to the second inverter 120 through the c-phase coil.

At an electrical angle of 30°, a current with an amplitude $I_2$ flows from the first inverter 110 to the second inverter 120 through the a-phase coil, a current with an amplitude $I_{pk}$ flows from the second inverter 120 to the first inverter 110 through the b-phase coil, and a current with the amplitude $I_2$ flows from the first inverter 110 to the second inverter 120 through the c-phase coil.

At an electrical angle of 60°, a current with an amplitude $I_1$ flows from the first inverter 110 to the second inverter 120 through the a-phase coil, and a current with the amplitude $I_1$ flows from the second inverter 120 to the first inverter 110 through the b-phase coil. At the electrical angle of 60°, the c-phase coil has a current of "0".

At an electrical angle of 90°, a current with the amplitude $I_{pk}$ flows from the first inverter 110 to the second inverter 120 through the a-phase coil, a current with the amplitude $I_2$ flows from the second inverter 120 to the first inverter 110 through the b-phase coil, and a current with the amplitude $I_2$ flows from the second inverter 120 to the first inverter 110 through the c-phase coil.

At an electrical angle of 120°, a current with the amplitude I1 flows from the first inverter 110 to the second inverter 120 through the a-phase coil, and a current with the amplitude I1 flows from the second inverter 120 to the first inverter 110 through the c-phase coil. At the electrical angle of 120°, the b-phase coil has a current of "0".

At an electrical angle of 150°, a current with the amplitude Inflows from the first inverter 110 to the second inverter 120 through the a-phase coil, a current with the amplitude $I_2$ flows from the first inverter 110 to the second inverter 120 through the b-phase coil, and a current with the amplitude $I_{pk}$ flows from the second inverter 120 to the first inverter 110 through the c-phase coil.

At an electrical angle of 180°, the a-phase coil has a current of "0". At the electrical angle of 180°, a current with the amplitude I1 flows from the first inverter 110 to the second inverter 120 through the b-phase coil, and a current with the amplitude I1 flows from the second inverter 110 to the first inverter 120 through the c-phase coil.

At an electrical angle of 210°, a current with the amplitude $I_2$ flows from the second inverter 120 to the first inverter 110 through the a-phase coil, a current with the amplitude $I_{pk}$ flows from the first inverter 110 to the second inverter 120 through the b-phase coil, and a current with the amplitude $I_2$ flows from the first inverter 110 to the second inverter 110 through the c-phase coil.

At an electrical angle of 240°, a current with the amplitude $I_1$ flows from the second inverter 120 to the first inverter 110 through the a-phase coil, and a current with the amplitude $I_1$ flows from the first inverter 110 to the second inverter 120 through the b-phase coil. At the electrical angle of 240°, the c-phase coil has a current of "0".

At an electrical angle of 270°, a current with the amplitude $I_{pk}$ flows from the second inverter 120 to the first inverter 110 through the a-phase coil, a current with the amplitude $I_2$ flows from the first inverter 110 to the second inverter 120 through the b-phase coil, and a current with the amplitude $I_2$ flows from the first inverter 110 to the second inverter 120 through the c-phase coil.

At an electrical angle of 300°, a current with the amplitude $I_1$ flows from the second inverter 120 to the first inverter 110 through the a-phase coil, and a current with the amplitude $I_1$ flows from the first inverter 110 to the second inverter 120 through the c-phase coil. At the electrical angle of 300°, the b-phase coil has a current of "0".

At an electrical angle of 330°, a current with the amplitude $I_2$ flows from the second inverter 120 to the first inverter 110 through the a-phase coil, a current with the amplitude $I_2$ flows from the second inverter 120 to the first inverter 110 through the b-phase coil, and a current with the amplitude $I_{pk}$ flows from the first inverter 110 to the second inverter 120 through the c-phase coil.

FIG. 2 illustrates the current waveforms in which the sum total of currents flowing through the coils of the three phases in consideration of a direction of each of the currents is "0" for each electrical angle. However, the control circuit 300 can also perform control in which the sum total of the currents is a value other than "0".

Figure 3:
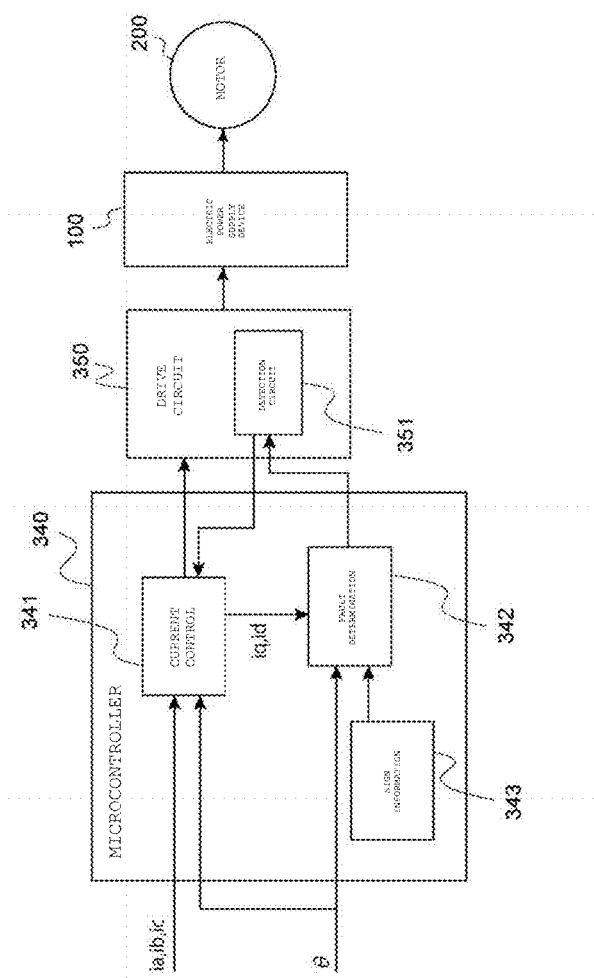
FIG. 3 is a functional block diagram focusing on switching between control under normal conditions and control under abnormal conditions.

FIG. 3 is a functional block diagram focusing on switching between control under normal conditions and control under abnormal conditions.

The microcontroller 340 includes a current control unit 341, a fault determination unit 342, and a sign information storage unit 343 as internal functions. The drive circuit 350 includes a detection circuit 351 as an internal function.

The current control unit 341 of the microcontroller 340 receives inputs of actual current values ia, ib, and ic, and an electrical angle θ obtained from a rotation signal, and then sets a target current value and generates a PWM signal. This target current value is set as a target current value in a rotating coordinate system of the motor 200. The current control unit 341 includes a function to convert the actual current values ia, ib, and ic of the respective phases of the motor 200 to actual current values iq and id in the rotating coordinate system. Thus, the current control unit 341 includes a function as an electric value calculation unit that calculates an electric value in each coordinate axis of the rotating coordinates of the motor 200 based on an electric value that is at least one of a current value and a voltage value generated in the motor 200. That is, the current control unit 341 includes the electric value calculation unit that calculates an electric value in each coordinate axis of rotating coordinates of a three-phase motor based on an electric value that is at least one of a current value and a voltage value generated in the three-phase motor. In the present embodiment, the current value is calculated as the electric value.

The current control unit 341 sets target current values under normal conditions and abnormal conditions, which are different from each other. For example, FIG. 2 shows three-phase energization control under normal conditions in which the current control unit 341 sets a constant current value as a target current value in the rotating coordinate system.

The detection circuit 351 of the drive circuit 350 detects an abnormality caused in the switch elements of the inverters 110 and 120, and has a function of fault detection based on a response of the motor 200 to a normal control signal and a function of fault identification using a test pattern. The fault detection is sensitively performed to enable fault to be always detected when the fault occurs, so that noise or the like may cause false detection. The fault identification uses a test pattern, so that fault can be detected more reliably and a switch element causing the fault also can be identified. Then, while the fault detection can be performed in a short time, the fault identification requires a long time.

Thus, the microcontroller 340 includes the fault determination unit 342 and the sign information storage unit 343 as a mechanism for shortening time by reducing the number of test patterns used in the fault identification.

The fault determination unit 342 determines a phase having a fault of the phases of the motor 200 based on the response of the motor 200 to the normal control signal. The fault determination unit 342 uses sign information stored in the sign information storage unit 343 for the determination.

Hereinafter, the sign information and a principle of the determination will be described.

When the current values Ia, Ib, and Ic flow through the coils of the corresponding phases (a-phase, b-phase, and c-phase) of the motor 200, the current values Iq, Id, and Iz in corresponding qdz axes directions of the rotating coordinate system of the motor 200 are acquired by the following Expression 1.

$$\begin{bmatrix} Id \\ Iq \\ Iz \end{bmatrix} = \begin{bmatrix} \dfrac{\sqrt{2}\, Ia\cos\theta}{\sqrt{3}} + \dfrac{\sqrt{2}\, Ib\cos\left(\theta - \dfrac{2\pi}{3}\right)}{\sqrt{3}} + \dfrac{\sqrt{2}\, Ic\cos\left(\theta - \dfrac{4\pi}{3}\right)}{\sqrt{3}} \\ -\dfrac{\sqrt{2}\, Ia\sin\theta}{\sqrt{3}} - \dfrac{\sqrt{2}\, Ib\sin\left(\theta - \dfrac{2\pi}{3}\right)}{\sqrt{3}} - \dfrac{\sqrt{2}\, Ic\sin\left(\theta - \dfrac{4\pi}{3}\right)}{\sqrt{3}} \\ \dfrac{Ia}{\sqrt{3}} + \dfrac{Ib}{\sqrt{3}} + \dfrac{Ic}{\sqrt{3}} \end{bmatrix} \quad (1)$$

The motor 200 is driven under conditions where, for example, the current value in each axial direction of the rotating coordinate system is constant as described above. However, even when the current values Iq, Id, and Iz in the respective axial directions of the rotating coordinate system are constant, the current values Ia, Ib, and Ic of the a-phase, the b-phase, and the c-phase have contribution components contributing to (influencing) the respective current values Iq, Id, and Iz, which change in accordance with the electrical angle θ.

Table 2 shows a contribution rate (influence rate) of each of the current values Ia, Ib, and Ic of the a-phase, the b-phase, and the c-phase to a current in a d-axis direction of the rotating coordinate system (hereinafter referred to as a "d-axis current") at every 30° electrical angle.

TABLE 2

| d-axis influence rate | Electrical angle [deg] | | | | | | | | | | | |
|---|---|---|---|---|---|---|---|---|---|---|---|---|
| | 0 (360) | 30 | 60 | 90 | 120 | 150 | 180 | 210 | 240 | 270 | 300 | 330 |
| a-phase | 1 | $\dfrac{\sqrt{3}}{2}$ | $\dfrac{1}{2}$ | 0 | $-\dfrac{1}{2}$ | $-\dfrac{\sqrt{3}}{2}$ | $-1$ | $-\dfrac{\sqrt{3}}{2}$ | $-\dfrac{1}{2}$ | 0 | $\dfrac{1}{2}$ | $\dfrac{\sqrt{3}}{2}$ |
| b-phase | $-\dfrac{1}{2}$ | 0 | $\dfrac{1}{2}$ | $\dfrac{\sqrt{3}}{2}$ | 1 | $\dfrac{\sqrt{3}}{2}$ | $\dfrac{1}{2}$ | 0 | $-\dfrac{1}{2}$ | $-\dfrac{\sqrt{3}}{2}$ | $-1$ | $-\dfrac{\sqrt{3}}{2}$ |
| c-phase | $-\dfrac{1}{2}$ | $-\dfrac{\sqrt{3}}{2}$ | $-1$ | $-\dfrac{\sqrt{3}}{2}$ | $-\dfrac{1}{2}$ | 0 | $\dfrac{1}{2}$ | $\dfrac{\sqrt{3}}{2}$ | 1 | $\dfrac{\sqrt{3}}{2}$ | $\dfrac{1}{2}$ | 0 |

Table 3 shows a contribution rate (influence rate) of each of the current values Ia, Ib, and Ic of the a-phase, the b-phase, and the c-phase to a current in a q-axis direction of the rotating coordinate system (hereinafter referred to as a "q-axis current") at every 30° electrical angle.

TABLE 3

| q-axis influence rate | Electrical angle [deg] | | | | | | | | | | | |
|---|---|---|---|---|---|---|---|---|---|---|---|---|
| | 0 (360) | 30 | 60 | 90 | 120 | 150 | 180 | 210 | 240 | 270 | 300 | 330 |
| a-phase | 0 | $-\dfrac{1}{2}$ | $-\dfrac{\sqrt{3}}{2}$ | $-1$ | $-\dfrac{\sqrt{3}}{2}$ | $-\dfrac{1}{2}$ | 0 | $\dfrac{1}{2}$ | $\dfrac{\sqrt{3}}{2}$ | 1 | $\dfrac{\sqrt{3}}{2}$ | $\dfrac{1}{2}$ |
| b-phase | $\dfrac{\sqrt{3}}{2}$ | 1 | $\dfrac{\sqrt{3}}{2}$ | $\dfrac{1}{2}$ | 0 | $-\dfrac{1}{2}$ | $-\dfrac{\sqrt{3}}{2}$ | $-1$ | $-\dfrac{\sqrt{3}}{2}$ | $-\dfrac{1}{2}$ | 0 | $\dfrac{1}{2}$ |
| c-phase | $-\dfrac{\sqrt{3}}{2}$ | $-\dfrac{1}{2}$ | 0 | $\dfrac{1}{2}$ | $\dfrac{\sqrt{3}}{2}$ | 1 | $\dfrac{\sqrt{3}}{2}$ | $\dfrac{1}{2}$ | 0 | $-\dfrac{1}{2}$ | $-\dfrac{\sqrt{3}}{2}$ | $-1$ |

As can be seen from Tables 2 and 3, the influence rate of each of the current values Ia, Ib, and Ic of the a-phase, the b-phase, and the c-phase depends on the electrical angle, and is alternately switched between influence in +direction and influence in −direction. An electrical angle range of the influence rates in +direction and an electrical angle range of the influence rates in −direction are different for each phase. In other words, the electrical angle at which the positive-negative sign of the influence rate is switched differs for each phase. Even in the same phase, the influence rates on the d-axis current and the influence rates on the q-axis current are different from each other in the electrical angle range having the influence rates in +direction and the electrical angle range having the influence rates in −direction.

The influence rates shown in Tables 2 and 3 are each a rate at which a current flowing through each of the a-phase, b-phase, and c-phase coils contributes to (influence) the d-axis current or the q-axis current. Thus, when a current of any of the a-phase, the b-phase, and the c-phase is lost or reduced (i.e., the phase has a fault), influence of the positive-negative sign opposite to the positive-negative sign of the influence rate shown in Tables 2 and 3 will occur. Sign information on influence caused when a phase has such a fault, being acquired by extracting the positive-negative sign every 30° electrical angle, is expressed by the following Expressions 2 and 3.

[Expression 2]

$$\text{id\_fault\_affect} = \begin{bmatrix} -1 & -1 & -1 & 0 & 1 & 1 & 1 & 1 & 1 & 0 & -1 & -1 \\ 1 & 0 & -1 & -1 & -1 & -1 & -1 & 0 & 1 & 1 & 1 & 1 \\ 1 & 1 & 1 & 1 & 1 & 0 & -1 & -1 & -1 & -1 & -1 & 0 \end{bmatrix} \quad (2)$$

[Expression 3]

$$\text{iq\_fault\_affect} = \begin{bmatrix} 0 & 1 & 1 & 1 & 1 & 1 & 0 & -1 & -1 & -1 & -1 & -1 \\ -1 & -1 & -1 & -1 & 0 & 1 & 1 & 1 & 1 & 1 & 0 & -1 \\ 1 & 1 & 0 & -1 & -1 & -1 & -1 & -1 & 0 & 1 & 1 & 1 \end{bmatrix} \quad (3)$$

Expressions 2 and 3 each show sign information on influence rates of the a-phase in a first line, and sign information on influence rates of b-phase and c-phase in second and third lines, respectively. Expressions 2 and 3 each also show sign information on an influence rate at an electrical angle of 0° in a first column, for example, and sign information on an influence rate at an electrical angle of 120° in a fifth column, for example.

The first line of Expression 2, for example, shows that a fault of a current of the a-phase causes negative influence (influence on reducing a current value) on the d-axis current in a range from an electrical angle of 0° to an electrical angle less than 90°, positive influence (influence on increasing a current value) thereon in a range from an electrical angle more than 90° to an electrical angle less than 270°, and negative influence (influence on reducing a current value) thereon in a range from an electrical angle more than 270° to an electrical angle of 360°.

The second line of Expression 3, for example, shows that a fault of a current of the b-phase causes negative influence (influence on reducing a current value) on the q-axis current in a range from an electrical angle of 0° to an electrical angle less than 120°, positive influence (influence on increasing a current value) thereon in a range from an electrical angle more than 120° to an electrical angle less than 300°, and negative influence (influence on reducing a current value) thereon in a range from an electrical angle more than 300° to an electrical angle of 360°.

Expression 4 for calculating the sign information (positive or negative of the contribution component) shown in Expressions 2 and 3 for a predetermined electrical angle θ is as follows:

$$q\_\text{affect}(a) = \text{sgn}(-\sin \theta)$$

$$q\_\text{affect}(b) = \text{sgn}(-\sin \theta - 2\pi/3)$$

$$q\_\text{affect}(c) = \text{sgn}(-\sin \theta - 4\pi/3)$$

$$d\_\text{affect}(a) = \text{sgn}(\cos \theta)$$

$$d\_\text{affect}(b) = \text{sgn}(\cos \theta - 2\pi/3)$$

$$d\_\text{affect}(c) = \text{sgn}(\cos \theta - 4\pi/3), \quad (4)$$

where q_affect (a), q_affect (b), and q_affect (c) are each sign information on a q-axis electric value in the corresponding one of the a-phase, the b-phase, and the c-phase, and d_affect (a), d_affect (b), and d_affect (c) are each sign information on a d-axis electric value in the corresponding one of the a-phase, the b-phase, and the c-phase, and then sgn (x) is expressed as −1 when x is less than 0, as 0 when x is 0, and 1 when x is more than 0.

The sign information shown in Expressions 2 and 3 (or the sign information represented by Expression 4) is stored in the sign information storage unit 343 illustrated in FIG. 3. The fault determination unit 342 receives input of actual current values of the d-axis and the q-axis from the current control unit 341, and combines positive-negative information, indicating whether a value is positive or negative, with at least one of a difference value between the actual current value and the target current value, and a variation of the difference value, for the d-axis and q-axis. That is, there is provided the fault determination unit 342 that determines a fault phase having a fault in phases of a three-phase motor by combining positive-negative information on at least one of a difference between a calculation electric value calculated by the electric value calculation unit and a target electric value indicating a control target of an electric value, and a variation of the difference, with each of the coordinate axes. Then, the fault determination unit 342 compares the combined positive-negative information with sign information at a current electrical angle θ. This comparison allows the fault determination unit 342 to determine that a phase with the sign information coinciding with the positive-negative information has a fault. In other words, the fault determination unit 342 determines the fault phase by checking consistency between the positive-negative information and the sign information.

This kind of fault determination is performed based on a response of the motor 200 to a normal control signal, and thus enables high-speed determination. The determination is also clear because it is performed based on whether a numerical value is positive or negative regardless of an amplitude of the numerical value. However, the determination is based only on the sign (positive or negative), so that the above-mentioned fault determination can be said to be estimation of the fault phase rather than definitive determination thereof.

In the present embodiment, the current value of the electric values (the voltage value and the current value) is used to determine (estimate) the fault phase. Even when the voltage value is used, comparing the positive-negative information with the sign information in the same manner as described above enables determination (estimation) of a fault phase. However, the positive-negative information is clearer when the current value is used than when the voltage value is used, so that using the current value facilitates determination (estimation) of the fault phase.

Figure 4:
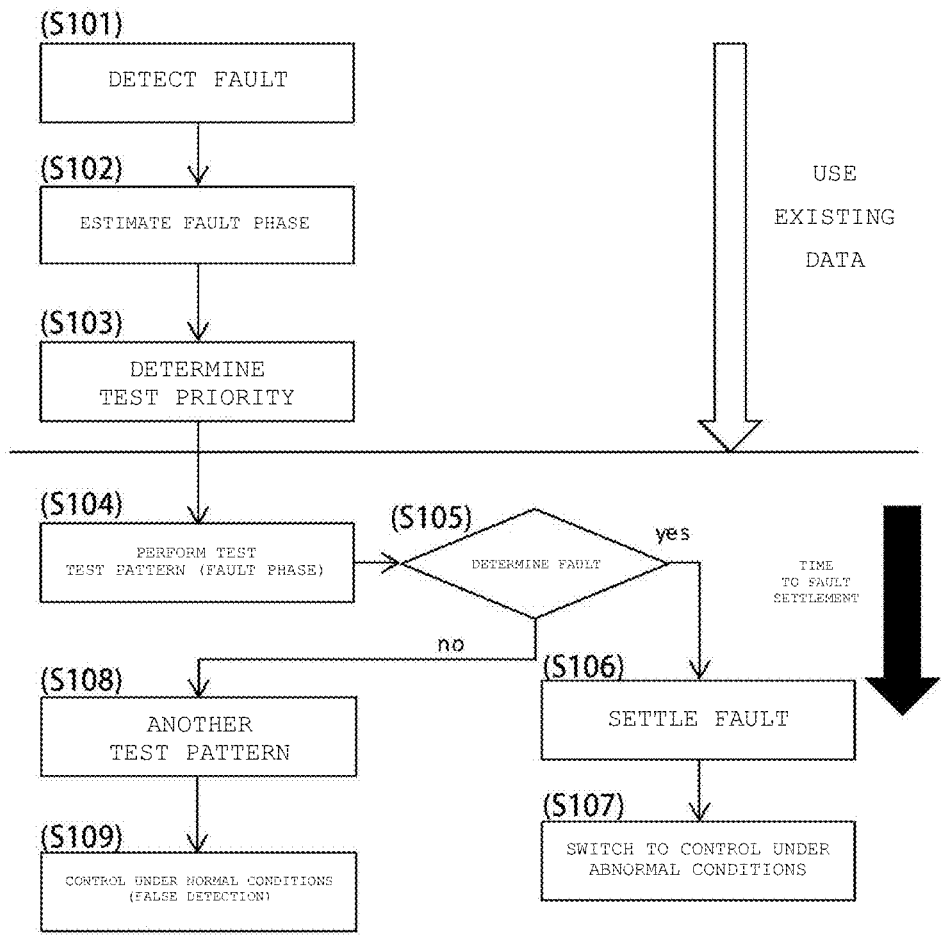
FIG. 4 is a flowchart illustrating a procedure for switching from control under normal conditions to control under abnormal conditions.

Positive-negative information on a variation of a difference value between the actual current value and the target current value is desirably used as the positive-negative information described above. This is because accuracy of fault detection using the positive-negative information on the variation of the difference value is higher than that using the positive-negative information on the difference value between the actual current value and the target current value. The motor 200 is an unconnected motor in the present embodiment, so that determination of the fault phase is easier than when the motor 200 is a connected motor. Then, a procedure for switching from control under normal conditions to control under abnormal conditions using fault determination as described above will be described. FIG. 4 is a flowchart illustrating the procedure for switching from the control under normal conditions to the control under abnormal conditions.

When a fault (sign) is detected by the above-mentioned fault detection (function of the detection circuit 351 in FIG. 3) (step S101), the fault determination unit 342 determines (estimates) a phase having a fault (step S102). The determined (estimated) phase is notified from the fault determination unit 342 to the detection circuit 351. The detection circuit 351 then determines application order in which a test pattern for checking a fault is preferentially performed on the notified phase as application order of the test pattern (step S103). The steps up to this point are performed at high speed because the response of the motor 200 to the normal control signal is used.

Then, the detection circuit 351 performs the above-mentioned fault identification using the test pattern, and the test pattern is first applied to a phase in which a fault is estimated (step S104). When fault determination of a test using the test pattern is performed (step S105) to settle a fault location (yes in step S105, step S106), information on the fault location is notified from the detection circuit 351 to the current control unit 341. The test pattern is preferentially applied to the fault phase, so that the time required to settle the fault location decreases. After that, the current control unit 341 switches control of the motor 200 to the control under abnormal conditions, suitable for the notified fault location (step S107).

When it is determined in step S105 that the phase has no fault (step S105: no), the detection circuit 351 performs the test pattern on a phase other than the phase in which the fault is estimated to check for no fault (i.e., false detection) (step S108). After that, the current control unit 341 continues the control under normal conditions described above (step S109).

Figure 5:
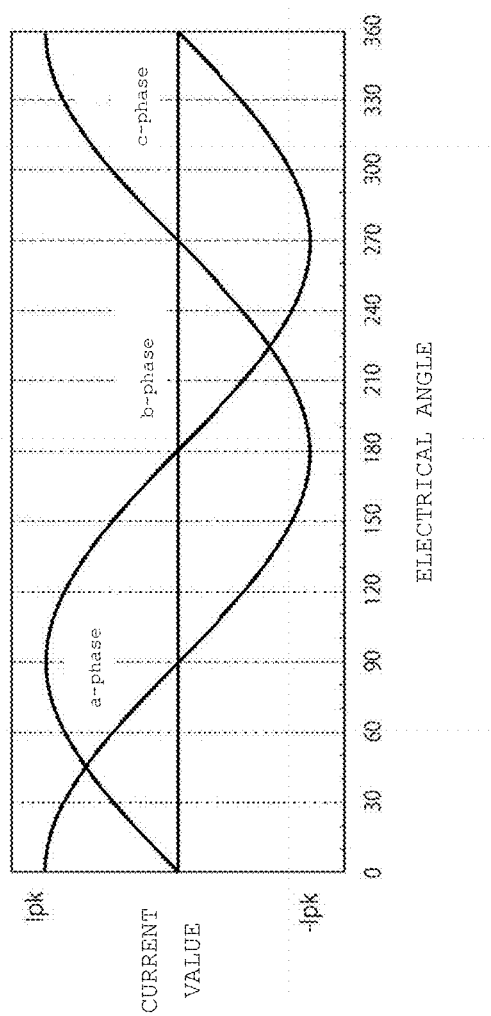
FIG. 5 is a diagram illustrating a current value flowing through each coil of corresponding one of phases of a motor 200 under abnormal conditions.

FIG. 5 is a diagram illustrating a current value flowing through each coil of corresponding one of phases of the motor 200 under abnormal conditions.

FIG. 5 exemplifies a current waveform acquired by plotting current values flowing through each of the a-phase, b-phase, and c-phase coils of the motor 200 when the first inverter 110 and the second inverter 120 are controlled according to control under abnormal conditions.

FIG. 5 has a horizontal axis representing a motor electrical angle (deg), and a vertical axis representing a current value (A). Each of the phases has a maximum current value (peak current value) indicated as $I_{pk}$. Here, a current waveform when the b-phase has a fault is illustrated as an example. When the b-phase has a fault, two-phase drive control is performed in which a current flows only through the a-phase and c-phase coils.

Table 4 exemplifies a current value flowing through each of the a-phase, b-phase, and c-phase coils of the motor 200 for each electrical angle when the first inverter 110 and the second inverter 120 are controlled by energization control allowing the current waveform illustrated in FIG. 5 to be obtained. Specifically, when the b-phase has a fault, Table 4 shows not only a current value flowing to a connection point between the first inverter 110 and one end 210 of each of the a-phase, b-phase, and c-phase coils at every 30° electrical angle, but also a current value flowing to a connection point between the second inverter 120 and the other end 220 of each of the a-phase, b-phase, and c-phase coils at every 30° electrical angle. The direction of a current is defined as described above.

TABLE 4

| Operation under abnormal conditions | | Electrical angle [deg] | | | | | | | | | | |
|---|---|---|---|---|---|---|---|---|---|---|---|---|
| | | 0 (360) | 30 | 60 | 90 | 120 | 150 | 180 | 210 | 240 | 270 | 300 | BO |
| First inverter | a-phase | 0 | $I_2$ | $I_1$ | Ipk | $I_1$ | $I_2$ | 0 | $-I_2$ | $-I_1$ | $-Ipk$ | $-I_1$ | $I_2$ |
| | b-phase | OFF | OFF | OFF | OFF | OFF | OFF | OFF | OFF | OFF | OFF | OFF | OFF |
| | c-phase | Ipk | $I_1$ | $I_2$ | 0 | $-I_2$ | $-I_1$ | $-Ipk$ | $-I_1$ | $-I_2$ | 0 | $I_2$ | $I_1$ |

TABLE 4-continued

| Operation under abnormal conditions | | 0 (360) | 30 | 60 | 90 | 120 | 150 | 180 | 210 | 240 | 270 | 300 | BO |
|---|---|---|---|---|---|---|---|---|---|---|---|---|---|
| Second inverter | a-phase | 0 | $-I_2$ | $-I_1$ | $-I_{pk}$ | $-I_1$ | $-I_2$ | 0 | $I_2$ | $I_1$ | $I_{pk}$ | $I_1$ | $I_2$ |
| | b-phase | OFF | OFF | OFF | OFF | OFF | OFF | OFF | OFF | OFF | OFF | OFF | OFF |
| | c-phase | $-I_{pk}$ | $-I_1$ | $-I_2$ | 0 | $I_2$ | $I_1$ | $I_{pk}$ | $I_1$ | $I_2$ | 0 | $-I_2$ | $-I_1$ |

The b-phase coil has a current being OFF (current is "0") at every electrical angle. The phase is desirably opened using a relay (not illustrated) to allow the current to be OFF. At an electrical angle of 0°, the a-phase coil has a current of "0". A current with an amplitude $I_{pk}$ flows from the first inverter 110 to the second inverter 120 through the c-phase coil.

At an electrical angle of 30°, a current with the amplitude $I_2$ flows from the first inverter 110 to the second inverter 120 through the a-phase coil, and a current with the amplitude $I_1$ flows from the first inverter 110 to the second inverter 120 through the c-phase coil. At an electrical angle of 60°, a current with the amplitude $I_1$ flows from the first inverter 110 to the second inverter 120 through the a-phase coil, and a current with the amplitude $I_2$ flows from the first inverter 110 to the second inverter 120 through the c-phase coil.

At an electrical angle of 90°, a current with the amplitude Ipk flows from the first inverter 110 to the second inverter 120 through the a-phase coil, and the c-phase coil has a current of "0".

At an electrical angle of 120°, a current with the amplitude $I_1$ flows from the first inverter 110 to the second inverter 120 through the a-phase coil, and a current with the amplitude $I_2$ flows from the second inverter 120 to the first inverter 110 through the c-phase coil.

At an electrical angle of 150°, a current with the amplitude $I_2$ flows from the first inverter 110 to the second inverter 120 through the a-phase coil, and a current with the amplitude $I_1$ flows from the second inverter 120 to the first inverter 110 through the c-phase coil.

At an electrical angle of 180°, the a-phase coil has a current of "0". At an electrical angle of 180°, a current with the amplitude $I_{pk}$ flows from the second inverter 120 to the first inverter 110 through the c-phase coil.

At an electrical angle of 210°, a current with the amplitude Inflows from the second inverter 120 to the first inverter 110 through the a-phase coil, and a current with the amplitude $I_1$ flows from the second inverter 120 to the first inverter 110 through the c-phase coil. At an electrical angle of 240°, a current with the amplitude $I_1$ flows from the second inverter 120 to the first inverter 110 through the a-phase coil, and a current with the amplitude $I_2$ flows from the second inverter 120 to the first inverter 110 through the c-phase coil.

At an electrical angle of 270°, a current with the amplitude Ipk flows from the second inverter 120 to the first inverter 110 through the a-phase coil, and the c-phase coil has a current of "0".

At an electrical angle of 300°, a current with the amplitude $I_1$ flows from the second inverter 120 to the first inverter 110 through the a-phase coil, and a current with the amplitude $I_2$ flows from the first inverter 110 to the second inverter 120 through the c-phase coil.

At an electrical angle of 330°, a current with the amplitude $I_2$ flows from the second inverter 120 to the first inverter 110 through the a-phase coil, and a current with the amplitude $I_1$ flows from the first inverter 110 to the second inverter 120 through the c-phase coil.

Vehicles such as automobiles are each generally equipped with a power steering. A power steering 2000 generates auxiliary torque for assisting steering torque of a steering system 520 generated by a driver operating a steering handle 521. The auxiliary torque is generated by an auxiliary torque mechanism 540, and enables reducing a burden on a driver for operation. For example, the auxiliary torque mechanism 540 includes a steering torque sensor 541, an ECU 542, a motor 543, a speed reduction mechanism 544, and the like. The steering torque sensor 541 detects steering torque in the steering system 520. The ECU 542 generates a drive signal based on a detection signal of the steering torque sensor 541. The motor 543 generates an auxiliary torque suitable for steering torque based on the drive signal, and transfers the auxiliary torque to the steering system 520 using the speed reduction mechanism 544.

Figure 6:
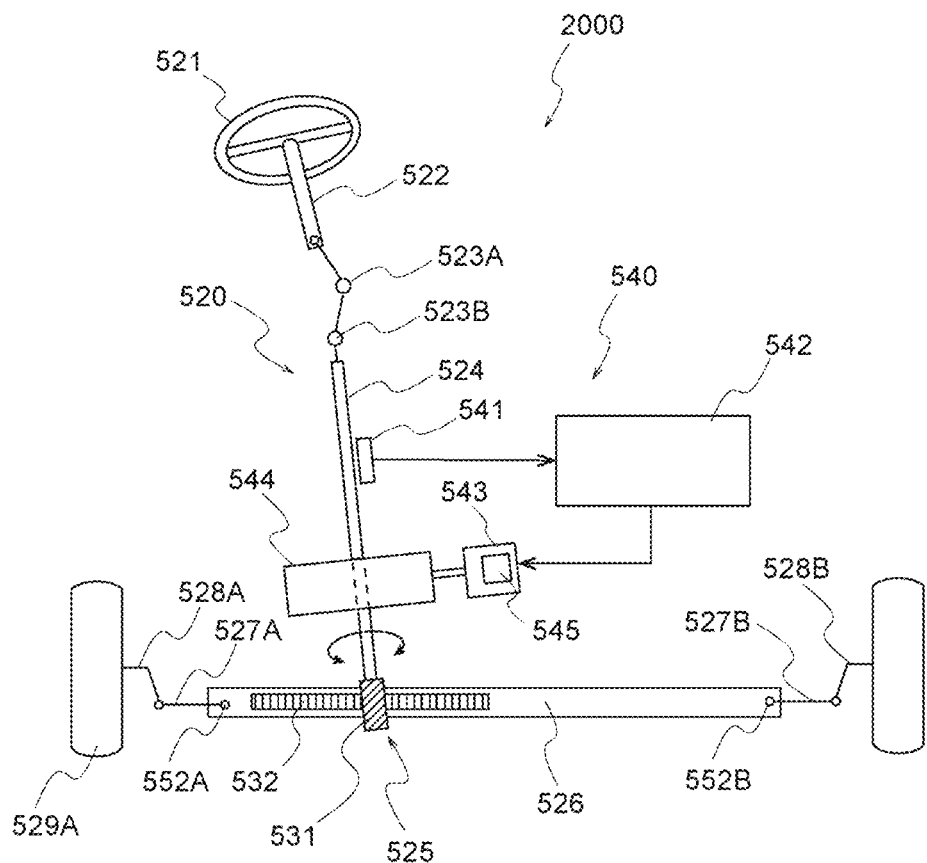
FIG. 6 is a diagram schematically illustrating a structure of a power steering according to the present embodiment.

The motor drive unit 1000 of the above embodiment is suitably used for a power steering. FIG. 6 is a diagram schematically illustrating a structure of the power steering 2000 according to the present embodiment. The power steering 2000 includes the steering system 520 and the auxiliary torque mechanism 540.

The steering system 520 includes, for example, a steering handle 521, a steering shaft 522 (also referred to as a "steering column"), universal couplings 523A and 523B, and a rotating shaft 524 (also referred to as a "pinion shaft" or "input shaft").

The steering system 520 includes, for example, a rack and pinion mechanism 525, a rack shaft 526, left and right ball joints 552A and 552B, tie rods 527A and 527B, knuckles 528A and 528B, and left and right steering wheels (e.g., left and right front wheels) 529A and 529B.

The steering handle 521 is connected to the rotating shaft 524 using the steering shaft 522 and the universal couplings 523A and 523B. The rotating shaft 524 is connected to the rack shaft 526 using the rack and pinion mechanism 525. The rack and pinion mechanism 525 includes a pinion 531 provided on the rotating shaft 524 and a rack 532 provided on the rack shaft 526. The rack shaft 526 is connected at its right end to the right steering wheel 529A using a ball joint 552A, a tie rod 527A, and a knuckle 528A, which are provided in this order. As on the right side, the rack shaft 526 is connected at its left end to the left steering wheel 529B using a ball joint 552B, a tie rod 527B, and a knuckle 528B, which are provided in this order. Here, the right side and the left side respectively correspond to a right side and a left side as seen from a driver sitting in a seat.

The steering system 520 is configured such that steering torque is generated when the driver operates the steering handle 521, and is transferred to the left and right steering wheels 529A and 529B using the rack and pinion mechanism 525. This enables the driver to operate the left and right steering wheels 529A and 529B.

The auxiliary torque mechanism 540 includes, for example, the steering torque sensor 541, the ECU 542, the motor 543, the speed reduction mechanism 544, and an electric power supply device 545. The auxiliary torque mechanism 540 applies auxiliary torque to the steering system 520 from the steering handle 521 to the left and right steering wheels 529A and 529B. The auxiliary torque may be referred to as "additional torque".

As the ECU 542, for example, the control circuit 300 illustrated in FIG. 1 or the like is used. As the electric power supply device 545, for example, the electric power supply device 100 illustrated in FIG. 1 or the like is used. As the motor 543, for example, the motor 200 illustrated in FIG. 1 or the like is used. The ECU 542, the motor 543, and the electric power supply device 545 may constitute a unit generally referred to as a "mechanical and electrical integrated motor". Elements illustrated in FIG. 6 include elements excluding the ECU 542, the motor 543, and the electric power supply device 545, and constituting a mechanism that corresponds to an example of a power steering mechanism driven by the motor 543.

The steering torque sensor 541 detects steering torque of the steering system 520, applied using the steering handle 521. The ECU 542 generates a drive signal for driving the motor 543 based on a detection signal from the steering torque sensor 541 (hereinafter, referred to as a "torque signal"). The motor 543 generates auxiliary torque suitable for the steering torque based on the drive signal. The auxiliary torque is transferred to the rotating shaft 524 of the steering system 520 using the speed reduction mechanism 544. The speed reduction mechanism 544 is, for example, a worm gear mechanism. The auxiliary torque is further transferred from the rotating shaft 524 to the rack and pinion mechanism 525.

The power steering 2000 is classified into a pinion assist type, a rack assist type, a column assist type, or the like, depending on a place in the steering system 520, to which auxiliary torque is applied. FIG. 6 illustrates the power steering 2000 of the pinion assist type. The power steering 2000 is also applied to the rack assist type, the column assist type, and the like.

The ECU 542 can receive not only a torque signal, but also a vehicle speed signal, for example. The microcontroller 340 of the ECU 542 can control the motor 543 based on the torque signal, the vehicle speed signal, and the like.

The ECU 542 sets a target current value based on at least the torque signal. The ECU 542 preferably sets the target current value in consideration of not only a signal of vehicle speed detected by the vehicle speed sensor but also a signal of rotation of the rotor detected by the angle sensor 320. The ECU 542 can control the drive signal of the motor 543, i.e., the drive current thereof so that the actual current value detected by the current sensor (refer to FIG. 1) coincides with the target current value.

The power steering 2000 enables the left and right steering wheels 529A and 529B to be operated by the rack shaft 526 using combined torque obtained by adding auxiliary torque of the motor 543 to steering torque of the driver. In particular, when the motor drive unit 1000 of the above-described embodiment is used for the above-mentioned mechanical and electrical integrated motor, appropriate current control can be performed under both normal conditions and abnormal conditions. As a result, power assist in the power steering 2000 is continued under both normal conditions and abnormal conditions.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A drive controller for controlling drive of a three-phase motor, the drive controller comprising:
   an electric value calculation unit configured to calculate an electric value in each of coordinate axes of rotating coordinates of the three-phase motor based on an electric value that is at least one of a current value or a voltage value generated in the three-phase motor;
   a sign information storage unit storing sign information; and
   a fault determination unit configured to
      combine, for each of the coordinate axes, positive-negative information on at least one of
         (i) a difference between the electric value calculated by the electric value calculation unit and a target electric value indicating a control target of an electric value in said each of the coordinate axes, or
         (ii) a variation of the difference, and determine, among phases of the three-phase motor, a phase with the sign information coinciding with the combined positive-negative information as a fault phase having a fault, wherein
   the drive controller is configured to, in response to determining the fault phase, switch control of the three-phase motor to a control of the three-phase motor under abnormal conditions.

2. The drive controller according to claim 1, wherein the electric value is a current value.

3. The drive controller according to claim 1, wherein the fault determination unit uses the combined positive-negative information on the variation of the difference.

4. The drive controller according to claim 1, wherein the three-phase motor is an unconnected motor.

5. The drive controller according to claim 1, wherein the fault determination unit is configured to determine the fault phase by checking consistency between (a) the sign information including a positive or a negative of a contribution component that is included in the electric value of each phase of the three-phase motor and contributes to the electric value in each of the coordinate axes, and (b) the combined positive-negative information.

6. The drive controller according to claim 5, wherein the fault determination unit is configured to use expressions below that are each expressed as the positive or the negative of the contribution component, $q\_affect(a) = \text{sgn}(-\sin \theta)$ $q\_affect(b) = \text{sgn}(-\sin \theta - 2\pi/3)$ $q\_affect(c) = \text{sgn}(-\sin \theta - 4\pi/3)$ $d\_affect(a) = \text{sgn}(\cos \theta)$ $d\_affect(b) = \text{sgn}(\cos \theta - 2\pi/3)$ $d\_affect(c) = \text{sgn}(\cos \theta - 4\pi/3)$ where each of the q_affect (a), the q_affect (b), and the q_affect (c) indicates a positive or a negative of a contribution component of a q-axis electric value in corresponding one of an a-phase, a b-phase, or a c-phase, each of the d_affect (a), the d_affect (b), and the d_affect (c) indicates a positive or a negative of a contribution component of a d-axis electric value in corresponding one of the a-phase, the b-phase, or the c-phase, θ is an electrical angle of the three-phase motor, and sgn (x) is expressed as −1 when x is less than 0, as 0 when x is 0, and 1 when x is more than 0.

7. The drive controller according to claim 1, wherein
the drive controller is configured to, in response to determining the fault phase,
   determine a fault location, and
   switch the control of the three-phase motor to the control of the three-phase motor under the abnormal conditions corresponding to the fault location.

8. A drive unit comprising:
a drive controller; and
a three-phase motor that is driven under control of the drive controller, wherein
the drive controller comprises:
   an electric value calculation unit configured to calculate an electric value in each of coordinate axes of rotating coordinates of the three-phase motor based on an electric value that is at least one of a current value or a voltage value generated in the three-phase motor;
   a sign information storage unit storing sign information; and
   a fault determination unit configured to
      combine, for each of the coordinate axes, positive-negative information on at least one of
         (i) a difference between the electric value calculated by the electric value calculation unit and a target electric value indicating a control target of an electric value in said each of the coordinate axes, or
         (ii) a variation of the difference, and
      determine, among phases of the three-phase motor, a phase with the sign information coinciding with the combined positive-negative information as a fault phase having a fault, and
the drive controller is configured to, in response to determining the fault phase, switch control of the three-phase motor to a control of the three-phase motor under abnormal conditions.

9. The drive unit according to claim 8, wherein
the drive controller is configured to, in response to determining the fault phase,
   determine a fault location, and
   switch the control of the three-phase motor to the control of the three-phase motor under the abnormal conditions corresponding to the fault location.

10. A power steering comprising:
a drive controller;
a three-phase motor that is driven under control of the drive controller; and
a power steering mechanism that is driven by the three-phase motor, wherein
the drive controller comprises:
   an electric value calculation unit configured to calculate an electric value in each of coordinate axes of rotating coordinates of the three-phase motor based on an electric value that is at least one of a current value or a voltage value generated in the three-phase motor;
   a sign information storage unit storing sign information; and
   a fault determination unit configured to
      combine, for each of the coordinate axes, positive-negative information on at least one of
         (i) a difference between the electric value calculated by the electric value calculation unit and a target electric value indicating a control target of an electric value in said each of the coordinate axes, or
         (ii) a variation of the difference, and
      determine, among phases of the three-phase motor, a phase with the sign information coinciding with the combined positive-negative information as a fault phase having a fault, and
the drive controller is configured to, in response to determining the fault phase, switch control of the three-phase motor to a control of the three-phase motor under abnormal conditions.

11. The power steering according to claim 10, wherein
the drive controller is configured to, in response to determining the fault phase,
   determine a fault location, and
   switch the control of the three-phase motor to the control of the three-phase motor under the abnormal conditions corresponding to the fault location.

* * * * *